United States Patent [19]

Lamoine

[11] 4,306,795
[45] Dec. 22, 1981

[54] SAFETY-LATCHING MECHANISM FOR A CAMERA MAGAZINE, AND CAMERA AND MAGAZINE PROVIDED WITH SUCH A MECHANISM

[75] Inventor: Pierre R. Lamoine, Ermont, France

[73] Assignee: U.S. Philips Corporation, New York, N.Y.

[21] Appl. No.: 128,707

[22] Filed: Mar. 10, 1980

[51] Int. Cl.³ .................. G03B 19/10; G03B 17/26; G03B 23/02
[52] U.S. Cl. .................................... 354/174; 354/275; 354/288; 352/72; 352/78 R
[58] Field of Search ................... 354/65, 74, 174, 275, 354/288; 352/72, 73, 78 R

[56] References Cited

U.S. PATENT DOCUMENTS 3,281,200  10/1966  Weninger ........................ 352/78 R
3,574,296   4/1971  Prochnow et al. ................ 354/275
3,637,298   1/1972  Whitley .......................... 352/72

Primary Examiner—Russell E. Adams
Attorney, Agent, or Firm—Marc D. Schechter

[57] ABSTRACT

The safety-latching mechanism according to the invention is in particular used for a camera which is disposed in the cockpit of an aircraft and which is subject to acceleration on the order of 10 g. The film magazine is interchangeable in flight by the pilot. For effectively attaching the magazine to the camera body, the mechanism comprises three fixing points. At least one fixing point, which is of a first type, comprises a centering cam which cooperates with a bore. At least one other fixing point, which is of a second type, comprises a latch, which is pivotally mounted on the camera body and which, against the action of a spring, presses against an insertion surface or a blocking surface on the magazine. The two surfaces adjoin each other and are disposed near the bottom wall of the magazine.

7 Claims, 10 Drawing Figures

SAFETY-LATCHING MECHANISM FOR A CAMERA MAGAZINE, AND CAMERA AND MAGAZINE PROVIDED WITH SUCH A MECHANISM

BACKGROUND OF THE INVENTION

The invention relates to a safety-latching mechanism for latching a camera magazine relative to a camera. In particular, the invention relates to a safety latch for a camera which is located in the cockpit of an aircraft and which is subject to acceleration on the order of 10 g. The camera magazine is separable from the camera body.

The invention is, in particular, applied to a sighting recorder of a fire-arm which is located in the cockpit of a fighter. The operation of the camera is controlled by the trigger of the fire-arm. As a result of the recoil of the fire-arm at the instant of firing, the camera may be subject to very high accelerations up to 10 g (g being the acceleration due to gravity) especially in the direction of flight, which is hereinafter referred to as the longitudinal direction.

Due to these very strong vibrations, the camera magazine, which accommodates the film to be exposed, should be very stable relative to the camera body. This requirement is imposed in order to avoid a relative displacement between the film and the camera body as a result of the heavy shocks during exposure. Such displacement would result in blurring of the recorded pictures.

In the present state of the art this problem is solved in that the magazine forms an integral part of the camera body. However, such an arrangement has two drawbacks. First, the exposed film can be replaced with unexposed film only when the aircraft is not airborne; and second, it can be replaced only by removing the camera itself, so that the camera is subject to shocks during handling and in transit between the aircraft and the location where it is reloaded. If such a camera, loaded with an unexposed film, is refitted in the cockpit of a fighter, in flight replacement of the exposed film by the pilot is not possible because the pilot can only use his left hand for this operation. Thus, during a raid the number of available exposures is limited to the capacity of a single film.

A safety-latching mechanism for a camera magazine of the type described above is known from French Utility Certificate No. 2,269,844. This relates to a camera for recording measurements during test flights. The latching mechanism described in that Certificate is intricate and comprises several tens of components, some of which are difficult to manufacture, such as a centering device comprising a slot and a ridge, as well as a blocking mechanism comprising a rectilinearly movable knob and two laterally movable latches.

SUMMARY OF THE INVENTION

It is an object of the invention to provide a safety-latching mechanism for a camera magazine, which mechanism is simple to operate and can withstand high accelerations, on the order of 10 g, substantially without any relative displacement between the magazine and the camera.

The safety latching mechanism according to the invention comprises three fixing points for the magazine. At least one fixing point, which is of a first type, comprises a combination of a centering cam and a bore. At least one other fixing point, which is of a second type, comprises a latch which is mounted on a support that is pivotally mounted on the camera body. Due to the action of a spring, the latch cooperates with two surfaces of the magazine. These two surfaces hve an angle between each other and they are situated near an outer wall of the magazine. These surfaces are an insertion surface and a blocking surface. A cam on the camera body urges the latch against the blocking surface, in the direction of the camera body, after the magazine has been placed in position.

In the known safety-latching mechanism, the magazine takes the form of a rectangular parallelepiped and the magazine is urged against the camera body with a front and a bottom surface. In this respect, it is found to be favorable if the first surface of the magazine is coupled to the camera body by two fixing points of the first type, while the bottom surface is coupled to the body by one fixing point of the second type.

In another embodiment this three-point fixation is reversed; the front surface is coupled to the camera body by one fixing point of the first type, whereas the bottom surface is coupled to the camera body by two fixing points of the second type.

The invention will be described in more detail with reference to the drawings.

DESCRIPTION OF THE PREFERRED EMBODIMENTS

Figure 1B:
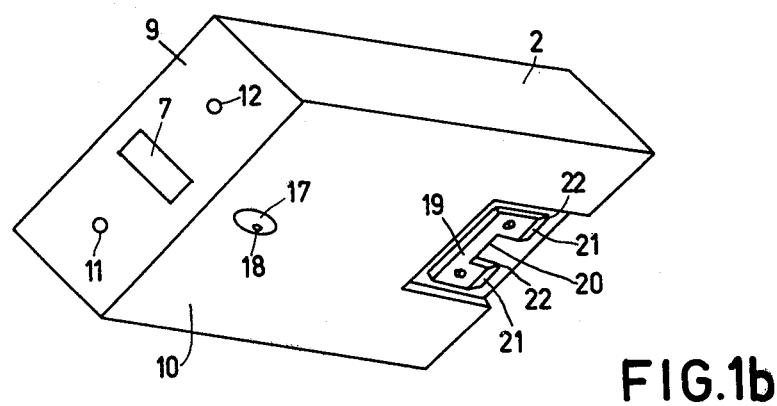
FIGS. 1a and 1b, shown in a perspective view, the body and the magazine of a camera incorporating a safety-latching mechanism, according to the invention.

In all of the Figures corresponding reference numerals designate elements with the same functions.

Figure 1A:
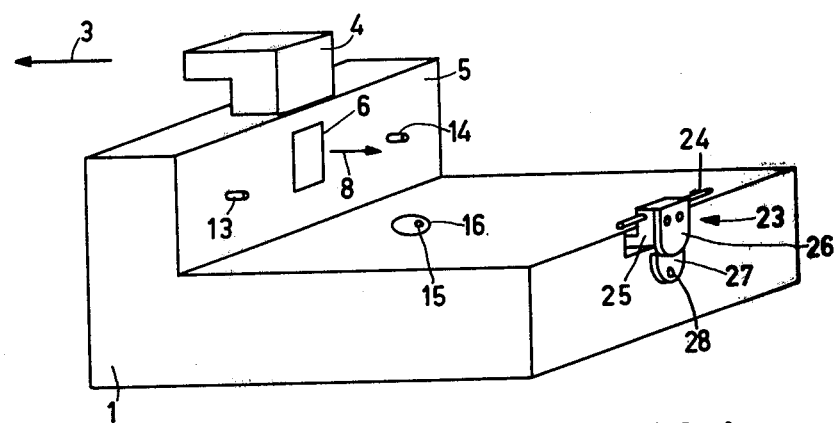

In FIG. 1a the reference numeral 1 designates the body of a camera, preferably a sighting recorder, which is to be mounted in the cockpit of a fighter aircraft. This body is adapted to be coupled to a magazine 2, accommodating a film to be exposed (see FIG. 1b.) The magazine substantially takes the form of a rectangular parallelepiped and the body/magazine assembly has been designated so that after these two elements have been coupled to each other the assembly also substantially has the shape of a rectangular parallelepiped. In FIG. 1a the arrow 3 indicates the sighting direction, or longitudinal direction, which hereinafter is assumed to be substantially horizontal.

In known manner, the body 1 is equipped with an optical device 4 comprising lenses and prisms. Inside an upper part 5, the body moreover comprises a prism, a mirror and a shutter, for example which rotates about a vertical axis. The light beams forming the image to be recorded pass through openings 6 and 7 in the body and the magazine, respectively, and are incident on the film. The beams, which extend in the longitudinal direction, are represented by the arrow 8 in FIG. 1a.

The magazine has a front surface 9 and a bottom surface 10. In addition to the opening 7, the front surface 9 of the magazine has two bores 11 and 12 which are adapted to cooperate with two centering cams 13 and 14. Cams 13 and 14 are located on the camera body and together with bores 11 and 12 constitute two fixing points of a first type. Alternatively the centering cams 13 and 14 may be provided on the magazine, the bores 11 and 12 then being formed in the camera body. FIGS. 1a and 1b show the preferred embodiment.

The film in magazine 2 is driven by a drive mechanism, not shown, which is accommodated in the camera magazine. The film motion is transmitted between the body and the magazine by means of a drive shaft 15 provided with a coupling pin 16. Shaft 15 cooperates with a driven crank 17, having a recess 18, which is flush with the bottom surface of the magazine. The drive mechanism is synchronized with the drive mechanism of the shutter.

Near the bottom surface 10 and the back of the magazine, substantially halfway up sides of the magazine, there is situated a U-shaped supporting plate 19. A central opening 20 is formed between the limbs of the U. The free ends of the limbs each have two surfaces which make an angle with each other. These surfaces are an insertion surface 21 and a blocking surface 22. (See FIGS. 2 and 3).

The supporting plate 19 cooperates with a latching device which is situated near the back of the camera body and which bears the general reference numeral 23. The latching device 23 cooperates with the supporting plate 19 in such a way that a third fixing point, of a second type, is obtained. Latching device 23 comprises a cylindrical rod 24 which is clamped in a support 25. Support 25 is pivotable about a transverse spindle 31, situated in a space 32 in the body. If desired, an unlatching lever 26 may be mounted on the support 25. A cam 27, which pivots about the longitudinal axis of the camera body and which is actuated by a knob 28, ensures that the magazine is safely latched in position after it has been placed on the camera body.

Figure 2:
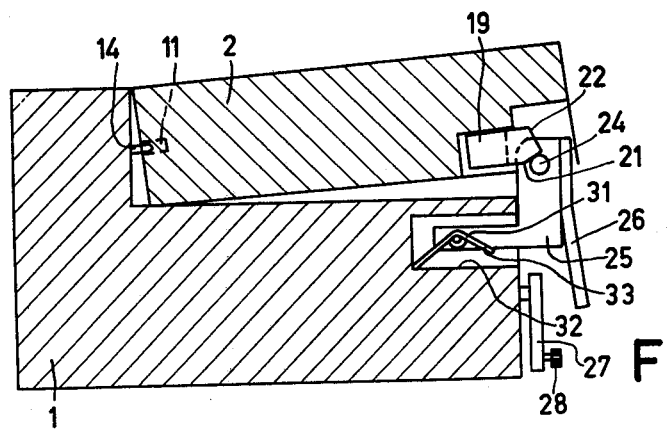
FIG. 2 is a cross-sectional view, taken on line II—II in FIG. 3, illustrating the initial stage of placing the magazine against the camera body.

FIG. 2 illustrates how the magazine is placed against the camera body. Placing is effected by gripping the magazine with one hand by the top surface and the upright sides. In order to facilitate the lateral guidance when the magazine is placed on the body, it is desirable if the opening 7 (FIG. 1b) is formed in a recessed part or in a projecting part, with a slightly conical shape, situated near the front 9 of the magazine. The recessed or projecting part, respectively, cooperates with a conical projecting or recessed part formed in the camera body at the location of the opening 6. Such recessed or projecting parts are not shown in the drawings. Lateral guidance can also be improved by giving the centering cams 13 and 14, as well as the bores 11 and 12, a conical shape. This last-mentioned feature also facilitates a slightly oblique insertion of the magazine, as illustrated in FIG. 2.

Around the spindle 31 in the space 32 a hinge spring 33 is wound, which tends to push the support 25 upwards. The position shown in FIG. 2, in which the magazine engages with the body the two long edges of the front 9, the centering cams 13 and 14 begin to engage the bores 11 and 12, and the rod 24 contacts the two insertion surfaces 21, is stable; i.e. the magazine remains in this position under the influence of its own weight. In order to place the magazine fully into position on the camera body a slight pressure must be exerted on the top of the magazine. The support 25 then pivots about the spindle 31 and the rod 24 moves over the insertion surfaces 21 to the blocking surfaces 22 without losing contact with the surfaces 21 or 22 during this movement. The insertion surfaces have an angle of inclination on the order of 30° relative to the major surface of the supporting plate 19.

Figure 3:
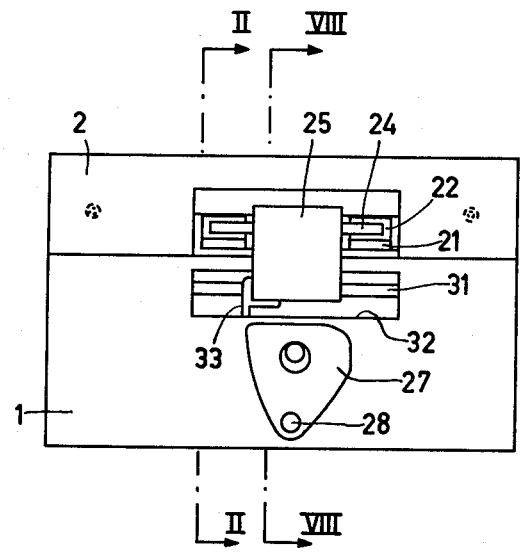
FIG. 3 is a side elevation view of the back of the magazine and the camera body, illustrating the final stage of placing the magazine in the camera body.

FIG. 3 illustrates the final stage of the movement of the magazine. In this final position, which is the latching position, the front 9 and the bottom 10 of the magazine engage with the camera body 1. The centering 13 and 14 fully engage with the bores 11 and 12, and the rod 24 exerts a slight pressure on the blocking surfaces 22 under the influence of the spring 33. The camera body/magazine assembly may then be turned upside down and the magazine will not become detached from the camera body.

The force with which the magazine bears against the camera body, which force is determined by the spring 33, is moderate and enables the magazine 2 to be removed in a simple manner by grasping the magazine by the two lateral sides and slightly pulling it. As a result of this pulling force the support 25 pivots slightly downwards about the spindle 31, which enables the magazine to be removed. Therefore, the unlatching lever 26 may be dispensed with and is not shown in FIGS. 3 and 4.

Figure 4:
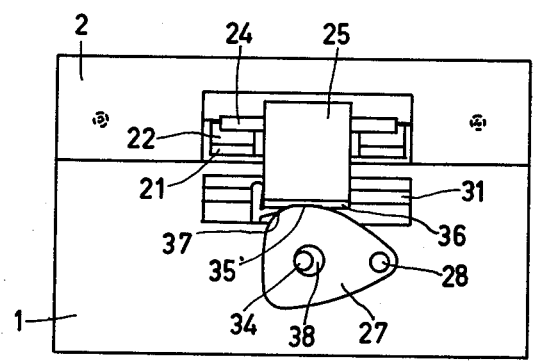
FIG. 4 is a similar view as in FIG. 3 after completion of the safety-latching operation.

FIG. 4 illustrates the change from the latched position of FIG. 3 to a safety-latching position. In FIG. 4 the cam 27 has been pivoted a quarter turn about a spindle 34, with the aid of an actuating knob 28, so that the cam bears against a surface 36 of the support 25 with a flat contact face 35. Adjoining the face 35, the cam 27 comprises a curved surface 37. Under the influence of the force exerted by the curved surface 37 during the pivotal movement of the cam 27, which force increases progressively to a maximum value reached in the position shown in FIG. 4, the support 25 and the rod 24 are moved slightly upwards. This movement is counteracted by the increasing pressure exerted on the blocking surfaces 22 by the rod 24. This movement of the support and the rod is possible only owing to the elasticity of the support 25, the rod 24 and the spindle 31. The vector of this force, exerted on the blocking surfaces 22, is directed towards the camera body and thus makes an angle with a plane through the three fixing points. The direction of this vector depends on the angle of inclination of the surfaces 22. This angle of inclination is approximately 15° relative to the vertical and toward the bottom surface 10.

The support 25 and the cam 27 and, in more general terms, the elements constituting the latching device 23, are preferably made of stainless steel or for example steel 30NC11. Furthermore, the surfaces of the support 25 and the cam 27 which cooperate with each other, especially the surfaces 35, 36 and 37, have been ground for an improved resistance to wear.

However, after a large number of actuations the wear may be such that the rod 24 no longer bears correctly against the blocking surfaces 22. Under such conditions it is possible that an acceleration on the order of 10 g, which is comparable to a shock, may produce a relative displacement between the magazine and the body. In order to restore the nominal pressure necessary between the magazine and the body in a simple manner, the cam 27 may be arranged on a spindle 34 via an accentric 38 (FIG. 4). By adjusting the position of the eccentric 38 relative to the cam 27. It is then possible to compensate for the play as a result of wear of the rod 24 and the surface 22.

In order to obtain pictures of a satisfactory quality, the maximum relative displacement between the film and the optical system of the camera is approximately 0.08 mm. Obviously, this presents no problem if the magazine is an integral part of the camera. If the magazine is to be detached from the camera, as in the present case, a maximum relative displacement of 0.03 mm between camera body and magazine is adopted and experience has taught that this is sufficient to ensure that the aforementioned maximum relative displacement between the film and the optical system is not exceeded. The tolerance of 0.03 mm demands a comparatively high accuracy in respect to the relative arrangement of the centering cams 13 and 14 and the bores 11 and 12, in respect to their respective diameters, and in respect of the location of the supporting plate 19. Preferably, the five relevant fixing elements 11 through 14 and 19 are manufactured separately for three reasons. First of all, this enables the housing of the camera body and that of the magazine to be made of aluminium, i.e. a material with a low mechanical strength, and the fixing elements to be made of a harder material, preferably stainless steel or steel 30NC11, which is very hard. Secondly, this enables the fixing elements to be positioned relative to each other in two steps, as will be described with reference to FIGS. 5 and 6, namely a first step in which the parts, which are secured by means of screws, are positioned until they are in an optimum position relative to each other, and subsequently a second step with the final fixation by firmly tightening the bolts. Also, when they are worn, the parts can be replaced in an economic and easy manner.

Figure 5:
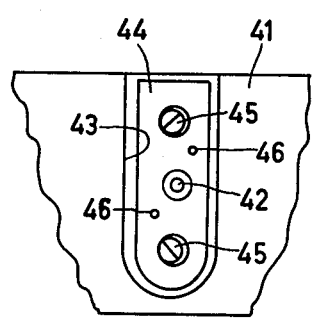
FIG. 5 shows a method of fixing a locating plate provided with a centering cam, or a bore with which the cam cooperates.

FIG. 5 shows a wall portion 41 of the front 9 of the magazine 2 or of the surface of the body 1 which cooperates therewith. Wall portion 41 has been provided with a centering cam 13, 14 or a bore 11 or 12, which are both represented by the reference numeral 42. In the wall portion 41 a space 43 is formed, which serves for mounting a steel locating plate 44 whose surface substantially adjoins the surface of wall 41 after it has been affixed to the wall by means of two screws 45. Around the screws 45 there has been provided a small clearance in the plate 44.

Thus, two spaces 43 may be provided in the magazine or the camera body. The two spaces 43 in the camera body are machined, for example, with a center-to-center separation having an accuracy on the order of 0.05 mm. The plate 44 which, for example have the centering cams 13 and 14, are subsequently secured in the centers of the spaces 43 with the aid of pins 46, which are forced through the plate and the wall portions 41 underneath. Two corresponding spaces 43 are formed in the front 9 of the magazine with the same center-to-center separation and the same accuracy as the aforementioned spaces 43 in camera body 1. Next, a jig is used to position the bores of the plates 44, which are connected to the magazine 2, at the same distance relative to each other as the centering cams. After the correct mutual distance has been obtained the plates are also secured by pins which are forced through the plates.

This method results in very small tolerances between the diameters of the bores 11 and 12 and the centering cams 13 and 14. These diameter tolerances range, for example between 8μ and 12μ. Such small tolerances are desirable in order to limit the "depression effect" of the parts in the case of shocks. However, a very small clearance is always necessary in order to enable the slightly oblique insertion into and removal of the magazine from the camera body. In order to mitigate the undesired effect, in such a way that very small tolerances can be obtained, the bores 11 and 12 are situated nearer to the bottom 10 of the magazine than to the top surface, yielding a better alignment in the longitudinal direction during insertion. The axial dimensions and the diameters of the centering cams and of the bores are of the order of 1 to 2 mm. They are related to the force of shocks to be transmitted and also depend on the tolerances between the centering cams and the bores.

Figure 6:
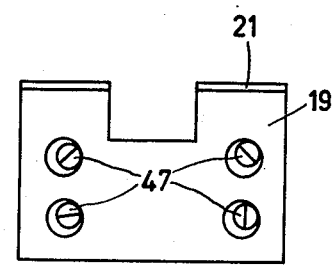
FIG. 6 shows a method of fixing a supporting plate which is provided with insertion and blocking surfaces.

As stated above, the supporting plate 19 can also be positioned relative to the rod 24. This is effected by securing the supporting plate 19, as is shown in FIG. 6, with, for example, four screws 47. After optimally aligning plate 19, screws 47 are locked in position by means of a locking agent, preferably Loctite from the Loctite Corp.

If one of the five fixing elements is to be replaced, the new part is fitted without the holes intended for the pins. After optimum alignment these holes are drilled, starting from the holes already formed in the aluminium wall of the magazine or the camera body. In practice, the spindles 31 and 34, which carry the support 25 and the cam 27, respectively, are each integral with a supporting member, which is not shown for the sake of simplicity and which is secured to the camera body.

Figure 7:
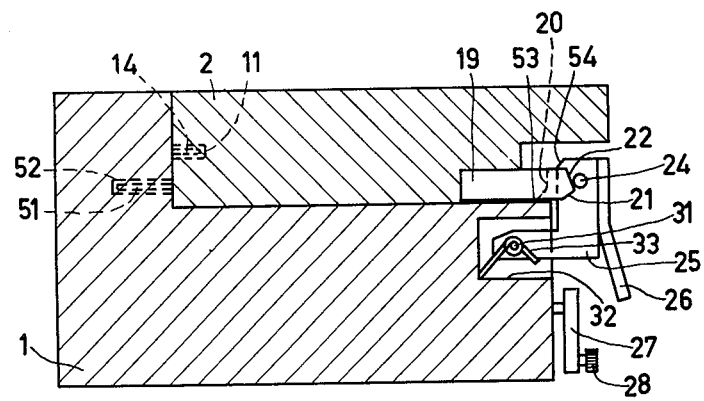
FIG. 7 is a cross-sectional view, taken on line II—II of FIG. 3, showing the embodiment of the invention described with reference to FIGS. 1 through 6 provided with an additional ejection mechanism for the magazine prior to ejection.
Figure 8:
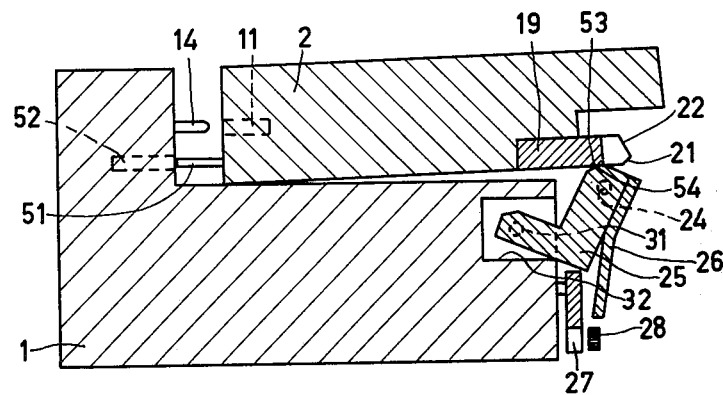
FIG. 8 is a cross-sectional view taken on line VIII—VIII in FIG. 3, showing the embodiment of the invention of FIG. 7 during the ejection of the magazine.

FIGS. 7 and 8 show a further embodiment of the safety-latching mechanism according to the invention, which enables the magazine to be ejected automatically.

In FIG. 7 the camera body is provided with two ejection limbs 51, each situated in a cavity 52. A spring, not shown, tends to urge the ejection limb 51 out of the recess 52. Under the pressure exerted by the front 9 of the magazine these two limbs, which are located near the side walls of the camera body, fully engage in the recesses 52. The supporting plate 19 is, moreover, provided with a ramp surface 53 which adjoins the central opening 20 (FIG. 1b) and which cooperates with a ramp surface 54. Ramp surface 54 forms part of the top edge of the support 25.

The geometry of the various parts is such that when starting from the position shown in FIG. 7 the unlatching lever 26 is actuated, the magazine is pushed back by the limbs 51 so that the ramp surface 53 engages with the ramp surface 54. This achieves the stop position shown in FIG. 8, the back of the magazine being moved upwards. If, starting from the position of FIG. 8, the unlatching lever 26 is released, the support 25 pivots upwards under the influence of the spring 33 and the surface 54 keeps pressing against the surface 53, so that the magazine is pivoted upwards about an axis which is disposed near the ends of the limbs 51. In the rest position, not shown, which is ultimately obtained, the pilot can readily grip the magazine thus released with one hand. In this embodiment insertion of a replacement magazine is also effected in a similar way as shown in FIG. 2, except that the position shown in FIG. 2 is now obtained by exerting a slight pressure on the magazine in order to counteract the action of the limbs 51.

Figure 9:
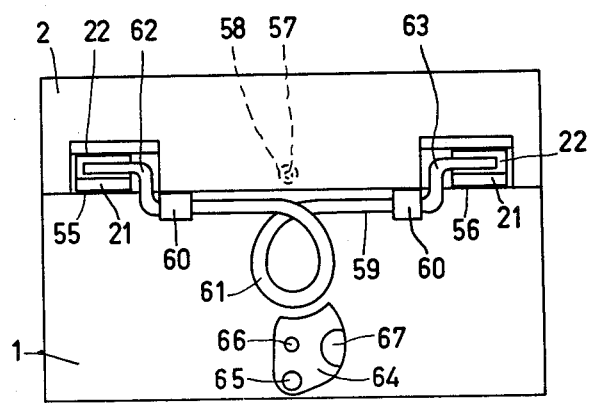
FIG. 9 shows still another embodiment of the invention in a view at the back of the magazine and the camera body.

FIG. 9 shows a further embodiment of a safety-latching mechanism according to the invention. In this embodiment, the supporting plate 19, which in the preceding embodiments may be compared with a single fixing point, has been replaced by two supporting plates 55 and 56, which are secured in the bottom wall of the magazine. As a result, in this embodiment there are two fixing points of the second type. Furthermore there is provided one fixing point of the first type, namely one centering cam 57, which cooperates with a single bore 58, substantially in the center of the front of the magazine.

A latch is made up of a rod 59, preferably made of a hard steel, which is rotatably journalled by two bearings 60, which are mounted in the camera body. In its center the latch 59 has a loop 61, which serves as lever and two cranks 62 and 63 at the ends, which project from the camera body. Owing to this construction the latch 59 also constitutes a support for the various parts.

The cranks 62 and 63 serve to transmit the torques exerted by the latch to the ends of the latch 59, which constitute the actual latching means. A first, comparatively small, latching torque is exerted on the latch 59 by one or two springs, not shown, which forms or form part of the camera body. A second torque which is substantially greater, is exerted by a safety latching cam 64, which is movable about a spindle 66 by an actuating knob 65. The cam 64 has a projection ground contact surface 67, which after having pivoted about a quarter of a turn engages underneath the loop 61. After the pivotal movement the surface 67 exerts a substantial pressure on the lower part of the loop 61 in accordance with a vector which is directed backwards. The resulting comparatively high torque which is exerted on the latch 59 is transmitted to the ends of the latch via the cranks 62 and 63, thereby providing the safety latching action. In a manner not shown, a spacer may be mounted on the spindle 66 in order to compensate for play due to wear. This further embodiment has the advantage that it is simpler, because of the smaller number of parts necessary for latching, while moreover the parts themselves are simple.

What is claimed is:

1. A safety-latching mechanism for latching a magazine relative to a camera body which is subject to high acceleration, said magazine being separable from the camera body, characterized in that;

the magazine is fixed to the camera body at three fixing points;

a first fixing point comprises a combination of a centering cam within a bore, the cam being fixed to one of either the magazine or the camera body and the bore being formed in the other of either the magazine or the camera body;

a second fixing point comprises a latching device, pivotably mounted on the camera body, and a supporting plate mounted on the magazine, said supporting plate having an insertion surface and a blocking surface which form an angle between each other, said latching device being spring biased to contact the insertion surface during insertion of the magazine and to contact the blocking surface after insertion of the magazine onto the camera body; and the mechanism further comprises a cam, rotatably mounted on the camera body, for urging the latching device against the blocking surface in the direction of the camera body after the magazine has been latched onto the camera body.

2. A safety-latching mechanism as claimed in claim 1, characterized in that the latching device comprises a cylindrical rod clamped in a support which is pivotably mounted on the camera body.

3. A safety-latching mechanism, as claimed in claim 2, characterized in that;

the magazine is shaped as a rectangular parallelepiped which contacts the camera body at front and bottom surfaces of the magazine;

the front of the magazine is fixed to the camera body by two fixing points of the first type; and the bottom of the magazine is fixed to the camera body by one fixing point of the second type.

4. A safety-latching mechanism, as claimed in claim 1, characterized in that;

the magazine is shaped as a rectangular parallelepiped which contacts the camera body at front and bottom surfaces of the magazine;

the front of the magazine is fixed to the camera body by one fixing point of the first type; and the bottom of the magazine is fixed to the camera body by two fixing points of the second type.

5. A safety-latching mechanism as claimed in claim 4, characterized in that the latching device comprises a rod having a loop in the center of the rod, two cranks on either side of the loop, and two latching portions at the ends of the rod, the latching portions contacting the insertion and blocking surfaces.

6. A safety-latching mechanism, as claimed in claim 1, 2, 3, 4, or 5, characterized in that the mechanism further comprises ejection means comprising:

two limbs, retractable in the camera body, spring biased to urge against the front of the magazine; and two ramps, one mounted on the magazine the other mounted on the camera body, which cooperate to lift the magazine when the magazine is urged rearward by the two limbs.

7. A safety-latching mechanism, as claimed in claim 6, characterized in that the cam rotates around a spindle which is connected to the camera body by means of an adjustable eccentric.

* * * * *